United States Patent
Tseng et al.

(10) Patent No.: US 10,627,890 B2
(45) Date of Patent: Apr. 21, 2020

(54) BRIDGE MODULE AND OPERATION METHOD THEREOF

(71) Applicant: ASMedia Technology Inc., New Taipei (TW)

(72) Inventors: Tien-Hsiang Tseng, New Taipei (TW); Ming-Wei Hsu, New Taipei (TW)

(73) Assignee: ASMEDIA TECHNOLOGY INC., New Taipei (TW)

(*) Notice: Subject to any disclaimer, the term of this patent is extended or adjusted under 35 U.S.C. 154(b) by 93 days.

(21) Appl. No.: 15/794,324

(22) Filed: Oct. 26, 2017

(65) Prior Publication Data

US 2018/0129260 A1    May 10, 2018

(30) Foreign Application Priority Data

Nov. 8, 2016 (TW) .............................. 105136320 A (51) Int. Cl.
*G06F 1/324*    (2019.01)
*G06F 1/3206*   (2019.01)
(Continued)

(52) U.S. Cl.
CPC ............... *G06F 1/324* (2013.01); *G06F 1/28* (2013.01); *G06F 1/3206* (2013.01);
(Continued)

(58) Field of Classification Search
CPC .......... G06F 1/324; G06F 1/28; G06F 1/3206; G06F 1/3253; H04B 1/38; Y02D 10/151; Y02D 10/126
See application file for complete search history.

(56) References Cited

U.S. PATENT DOCUMENTS 6,279,060 B1 * 8/2001 Luke ................... G06F 13/385
                                                     710/10
7,606,960 B2 * 10/2009 Munguia ............. G06F 1/3203
                                                     710/307
(Continued)

FOREIGN PATENT DOCUMENTS

TW      201224731 A    6/2012
TW      201510733 A    3/2015
TW      I497272 B      8/2015

OTHER PUBLICATIONS

Dan Harmon, "USB 2.0-ATA / ATAPI bridge components support cable-powered storage", http://www.ti.com.tw/articles/detail.asp?sno=40 (with English translation of pertinent parts), printed Jan. 29, 2018.

Primary Examiner — Phil K Nguyen
Assistant Examiner — Gayathri Sampath
(74) Attorney, Agent, or Firm — McClure, Qualey & Rodack, LLP (57) ABSTRACT

A bridge module is provided. The bridge module comprise a first transmission unit electrically connected to a host to receive a power status signal from the host; a second transmission unit electrically connected to a data transceiver device to have data transmission with the data transceiver device at a download data transmission speed; and a processing device electrically connected to the first transmission unit and the second transmission unit, and configured to adjust the download data transmission speed and a processor clock of the processing device according to the power status signal. An operation method is also provided.

6 Claims, 4 Drawing Sheets

(51) Int. Cl.
*G06F 1/3234* (2019.01)
*H04B 1/38* (2015.01)
*G06F 1/28* (2006.01)

(52) U.S. Cl.
CPC ............. *G06F 1/3253* (2013.01); *H04B 1/38* (2013.01); *Y02D 10/126* (2018.01); *Y02D 10/151* (2018.01)

(56) References Cited

U.S. PATENT DOCUMENTS

| | | |
|---|---|---|
| 8,661,281 B2 | 2/2014 | Chang et al. |
| 8,769,317 B2 | 7/2014 | Shih et al. |
| 8,924,621 B2 | 12/2014 | Jadus |
| 9,239,609 B2 | 1/2016 | Huang |
| 2005/0268129 A1 | 12/2005 | Julicher et al. |
| 2006/0174142 A1* | 8/2006 | Lin ........................ G06F 1/3203 713/300 |
| 2007/0081504 A1* | 4/2007 | Shih ....................... G06F 1/3203 370/338 |
| 2008/0162952 A1* | 7/2008 | Landers ................. G06F 1/3215 713/300 |
| 2009/0063877 A1* | 3/2009 | Lewis ..................... G06F 1/266 713/310 |
| 2010/0218026 A1* | 8/2010 | Toshimitsu ........... G06F 13/385 713/324 |
| 2011/0231685 A1* | 9/2011 | Huang ................... G06F 1/3203 713/321 |
| 2012/0023350 A1 | 1/2012 | Russo et al. |
| 2012/0144213 A1 | 6/2012 | Chang et al. |
| 2013/0132746 A1* | 5/2013 | Chen ...................... G06F 1/325 713/310 |
| 2013/0191653 A1 | 7/2013 | Shih et al. |
| 2014/0208126 A1* | 7/2014 | Mooney ................ G06F 13/14 713/300 |

\* cited by examiner

BRIDGE MODULE AND OPERATION METHOD THEREOF

CROSS-REFERENCE TO RELATED APPLICATION

This application claims the priority benefit of Taiwan application Ser. No. 105136320, filed on Nov. 8, 2016. The entirety of the above-mentioned patent application is hereby incorporated by references herein and made a part of specification.

BACKGROUND OF THE INVENTION

Field of the Invention

The invention relates to a bridge module and an operation method thereof.

Description of the Related Art

With the development of technology, bridge modules are widely used in various electric devices. The bridge module can be bridged between a host and a data transceiver device to exchange data therebetween. The bridge module and the data transceiver device are powered by the host. However, when the power energy provided by the host cannot satisfy the power consumption of the bridge module and the data transceiver device, the whole system may be damaged.

BRIEF SUMMARY OF THE INVENTION

According to an aspect of the disclosure, a bridge module is provided. The bridge module comprises: a first transmission unit electrically connected to a host, configured to receive a power status signal from the host; a second transmission unit electrically connected to a data transceiver device for data transmission with the data transceiver device at a download data transmission speed; and a processing device electrically connected to the first transmission unit and the second transmission unit, and configured to adjust the download data transmission speed and a processor clock of the processing device according to the power status signal.

According to another aspect of the disclosure, an operation method is provided. The operation method comprises: receiving a power status signal from a host via a first transmission unit; having data transmission with a data transceiver device at a download data transmission speed via a second transmission unit; and adjusting the download data transmission speed and a processor clock according to the power status signal.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used for limit the size or the proportion.

Figure 1:
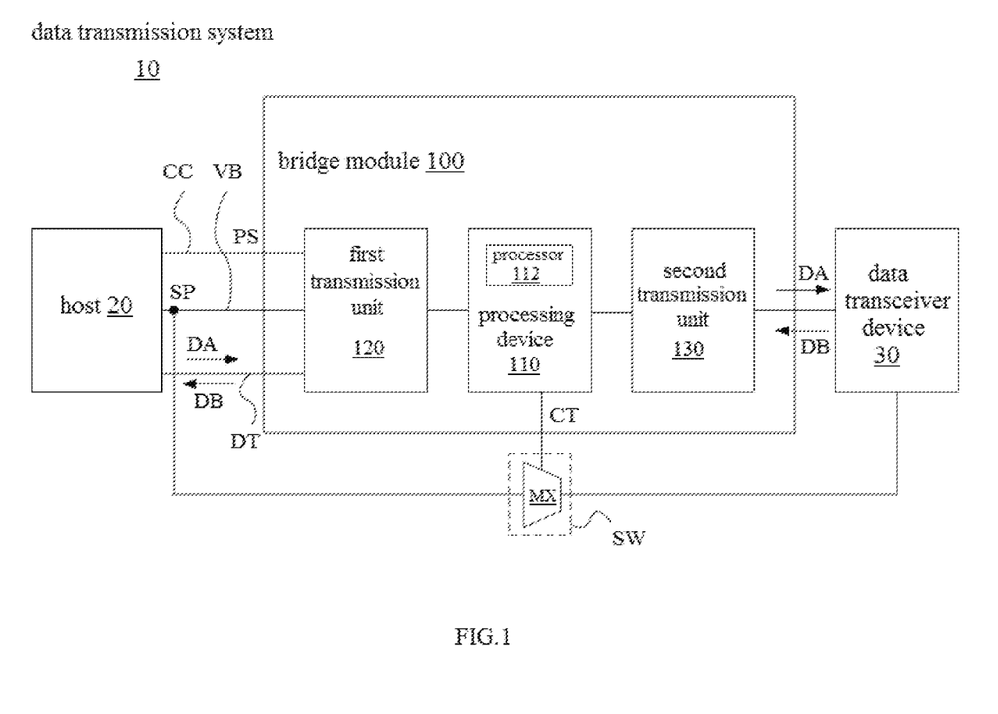
FIG. 1 is a schematic diagram showing a data transmission system in an embodiment.

FIG. 1 is a schematic diagram showing a data transmission system 10 in an embodiment. In the embodiment, a data transmission system 10 includes a bridge module 100, a host 20, and a data transceiver device 30. The bridge module 100 is electrically connected between the host 20 and the data transceiver device 30. The host 20 and the data transceiver device 30 exchange data with each other via the bridge module 100. In an embodiment, the bridge module 100 transfers the data DA from the host 20 to the data transfer transceiver device 30, and transfers the data DB from the data transfer transceiver device 30 to the host 20.

In the embodiment, the bridge module 100 includes a processing device 110, a first transmission unit 120, and a second transmission unit 130. The processing device 110 is electrically connected between the first transmission unit 120 and the second transmission unit 130.

In the embodiment, the first transmission unit 120 is electrically connected to the host 20 to receive the data DA from the host 20 or to transfer the data DB to the host 20. In an embodiment, the first transmission unit 120 is a USB transmission unit, a PCIe transmission unit, a SATA transmission unit or a transmission unit of other types.

In an embodiment, the first transmission unit 120 is electrically connected to the host 20 via a USB Type-C connection. In an embodiment, the first transmission unit 120 is electrically connected to the host 20 via pins CC, VB and DT. In an embodiment, the pin CC is a configuration channel pin (i.e., CC pin) in the USB Type-C connector. The pin VB is a VBUS pin in the USB Type-C connector. The pin DT includes a D+ pin and a D− pin or a TX pin and a RX pin in the USB Type-C connector.

In an embodiment, no other power supply is provided for the bridge module 100 and the data transceiver device 30. The host 20 provides the supply power SP to the bridge module 100 and the data transceiver device 30 via the pin VB to allow the bridge module 100 and data transceiver device 30 to operate according to the supply power SP.

In an embodiment, the host 20 provides a power status signal PS to the bridge module 100 via the pin CC to allow the bridge module 100 to operate according to the power status signal PS. The power status signal PS indicates the status of the supply power SP. In an embodiment, the power status signal PS indicates that the voltage of the supply power SP is 5V and the current is 3 A, or the voltage of the supply power SP is 5V and the current is 1.5 A.

In an embodiment, the bridge module 100 exchanges the data with the host 20 via the pin DT. In an embodiment, the second transmission unit 130 is electrically connected to the data transceiver device 30 to receive the data DB from the data transceiver device 30, and to transfer the data DA to the data transceiver device 30. In an embodiment, the second transmission unit 130 transfers data to the data transceiver device 30 at a download data transmission speed. In an embodiment, the second transmission unit 130 is a SATA transmission unit, a PCIe transmission unit or a USB transmission unit or a transmission unit of other types. In an embodiment, the data transceiver device 30 is a SATA hard disk, an IDE hard disk or an USB storage.

In an embodiment, the processing device 110 is configured to control the first transmission unit 120 and the second transmission unit 130 to exchange data with each other. In an embodiment, the processing device 110 is a central processing unit (CPU), a microprocessor, a FPGA, or other computing unit. In an embodiment, the processing device 110 further includes a processor 112. The processor 112 is used to control the first transmission unit 120 and the second transmission unit 130 to exchange data with each other. The processor 112 includes a processor clock. The processor clock corresponds to an instruction processing speed of the processor 112. In an embodiment, the processor 112 is a central processing unit, a microprocessor, or a computing unit of other type, which is not limited herein.

In an embodiment, the processing device 110 is configured to adjust the download data transmission speed of the second transmission unit 130 or the processor clock of the processor 112 according to the power status signal PS. As a result, unstable operations of the bridge module 100 or the data transceiver device 30 is avoid due to that a total power consumption of the bridge module 100 and the data transceiver device 30 is greater than the supply power SP provided by the host 20.

In an embodiment, the data transmission system 10 further includes a switch SW. The switch SW is electrically connected between the host 20 and the data transceiver device 30. The switch SW is operatively turned on/off to provide/cut off the supply power SP from the host 20 to the data transceiver device 30. In an embodiment, the processing device 110 is configured to output a control signal CT to the switch SW to turn off the switch SW according to the power status signal PS. Thus, the supply power SP is not provided to the data transceiver device 30. At the time, the data transceiver device 30 is disabled due to no supply power, which prevents the data transceiver device 30 from being damaged due to inadequate power.

In an embodiment, the switch SW includes a multiplexer MX. An input end of the multiplexer MX is electrically connected to the pin VB. An output end of the multiplexer MX is electrically connected to the data transceiver device 30. A control end of the multiplexer MX is used to receive the control signal CT. The multiplexer MX is turned on or turned off according to the control signal CT. In an embodiment, the switch SW has other types according to requirements.

Figure 2:
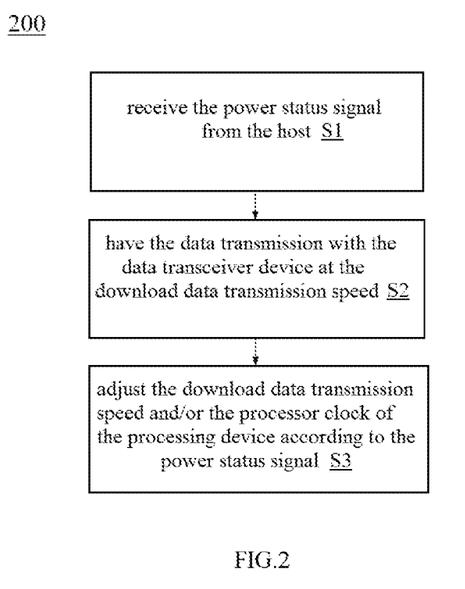
FIG. 2 is a flow chart of an operation method of a bridge module in an embodiment.

FIG. 2 is a flow chart of an operation method 200 of a bridge module in an embodiment. The operation method 200 can be applied in a bridge module that is similar to the bridge module shown in FIG. 1. In an embodiment, the operation method 200 is described hereinafter with reference to the data transmission system 10 in FIG. 1.

Unless mentioned otherwise, the sequence of the steps of the operation method can be changed according to requirements. In an embodiment, all/part of the steps are performed simultaneously. In embodiments, some steps can be added, replaced or cancelled according to requirements.

In an embodiment, the operation method 200 includes following steps. In step S1, the processing device 110 receives the power status signal PS from the host 20 via the first transmission unit 120. In an embodiment, the processing device 110 and the host 20 for data transmission is via the first transmission unit 120.

In an embodiment, the data transmission between the first transmission unit 120 and the host 20 is based on the USB3.0 protocol. In an embodiment, the power status signal PS corresponds to the supply power SP provided to the bridge module 100 and the data transceiver device 30 by the host 20.

In step S2, the processing device 110 transfers data to the data transceiver device 30 at a download data transmission speed via the second transmission unit 130.

In an embodiment, there are multiple predetermined download data transmission speeds, such as 6 GHz (which corresponds to the SATA3 protocol), 3 GHz (which corresponds to the SATA2 protocol), and 1.5 GHz (which corresponds to the SATA1 protocol). The processing device 110 selects one of the predetermined download data transmission speeds as the download data transmission speed.

In an embodiment, the processing device 110 selects the highest one of the predetermined download data transmission speed as the download data transmission speed. At the time, the second transmission unit 130 and the data transceiver device 30 for the data transmission is based on the SATA3 protocol. The download data transmission speed is 6 GHz. In embodiments, the download data transmission speed is determined in other ways, which is not limited herein.

In an embodiment, a value of a register of the second transmission unit 130 is set by the processing device 110 to set the transmission protocol and the download data transmission speed.

In step S3, the processing device 110 adjusts the download data transmission speed or the processor clock of the processor 112 according to the power status signal PS, to make the total power consumption of the data transceiver device 30 and the bridge module 100 less than the supply power SP. Thus, the unstable operations of the bridge module 100 or the data transceiver device 30 are prevented.

In an embodiment, the processing device 110 selects one of the predetermined download data transmission speeds as the adjusted download data transmission speed. In an embodiment, the transmission protocol of the data transmission between the second transmission unit 130 and the data transceiver device 30 is changed to the SATA2 protocol by the processing device 110 according to the power status signal PS, to adjust the download data transmission speed to 3 GHz.

In an embodiment, multiple predetermined processor clocks are provided. In an embodiment, the predetermined processor clocks are 156.25 MHz, 125 MHz and 30 MHz. One of the predetermined processor clocks is preset as a default processor clock. The processing device 110 selects one of the predetermined processor clocks as an adjusted processor clock according to the power status signal PS. In an embodiment, the default processor clock is 156.25 MHz, and the adjusted processor clock is 125 MHz. In an embodiment, the processor clock of the processor 112 is set by a value of a register of the processing device 110.

The power status signal PS corresponds to the download data transmission speed or the processor clock of the processor 112. In an embodiment, when the power status signal PS indicates that the voltage of the supply power SP is 5V and the current is 3 A, the corresponding download data transmission speed is 6 GHz that corresponds to the SATA3 protocol. The corresponding processor clock is 156.25 MHz. When the power status signal PS indicates the voltage of the supply power SP is 5V and the current is 1.5 A, the corresponding download data transmission speed is 3 GHz that corresponds to the SATA2 protocol. The corresponding processor clock is 125 MHz. When the power status signal PS indicates the voltage of the supply power SP is 5V and the current is 0.9 A, the corresponding download data transmission speed is 1.5 GHz that corresponds to the SATA1 protocol. The corresponding processor clock is 30 MHz.

In an embodiment, the corresponding relationship is pre-written into a look-up table. The processing device 110 obtains the corresponding download data transmission speed from the look-up table as the adjusted download data transmission speed according to the power status signal PS, or the processing device 110 obtains the corresponding processor clock from the look-up table as the adjusted processor clock. In an embodiment, a proper download data transmission speed or a proper processor clock are calculated according to the power status signal PS.

In such a way, the total power consumption of the data transceiver device 30 and the bridge module 100 is controlled to be less than the supply power SP. Thus, the unstable operations of the bridge module 100 and the data transceiver device 30 are prevented.

In an embodiment, when the host 20 controls a transmission interface between the host 20 and the bridge module 100 (and the data transceiver device 30) to be in a suspend mode (the U3 mode), the host 20 provides the lowest supply power SP (for example, the voltage is 5V and the current is 0.1 A) to the bridge module 100 and the data transceiver device 30. Additionally, the host 20 provides the corresponding power status signal PS to the bridge module 100.

At the time, the processing device 110 adjusts the download data transmission speed to 0 GHz (that is, the data transmission between the second transmission unit 130 and the data transceiver device 30 is interrupted), and adjusts the processor clock of the processor 112 to 0 MHz according to the power status signal PS. Additionally, the processing device 110 outputs the control signal CT to the switch SW to turn off the switch SW according to the power status signal PS, to cut off the supply power SP to the data transceiver device 30.

In such a way, the data transceiver device 30 is prevented from being damaged when the supply of the supply power SP is inadequate.

In an embodiment, after the step S3, the processing device 110 determines whether the total power consumption of the data transceiver device 30 and the bridge module 100 is less than the supply power SP when the processing device 110 operates at the adjusted download data transmission speed or at the adjusted processor clock. When the total power consumption of the data transceiver device 30 and the bridge module 100 is not less than the supply power SP, the processing device 110 further adjusts the download data transmission speed or the processor clock to make the total power consumption of the data transceiver device 30 and the bridge module 100 less than the supply power SP.

Figure 3:
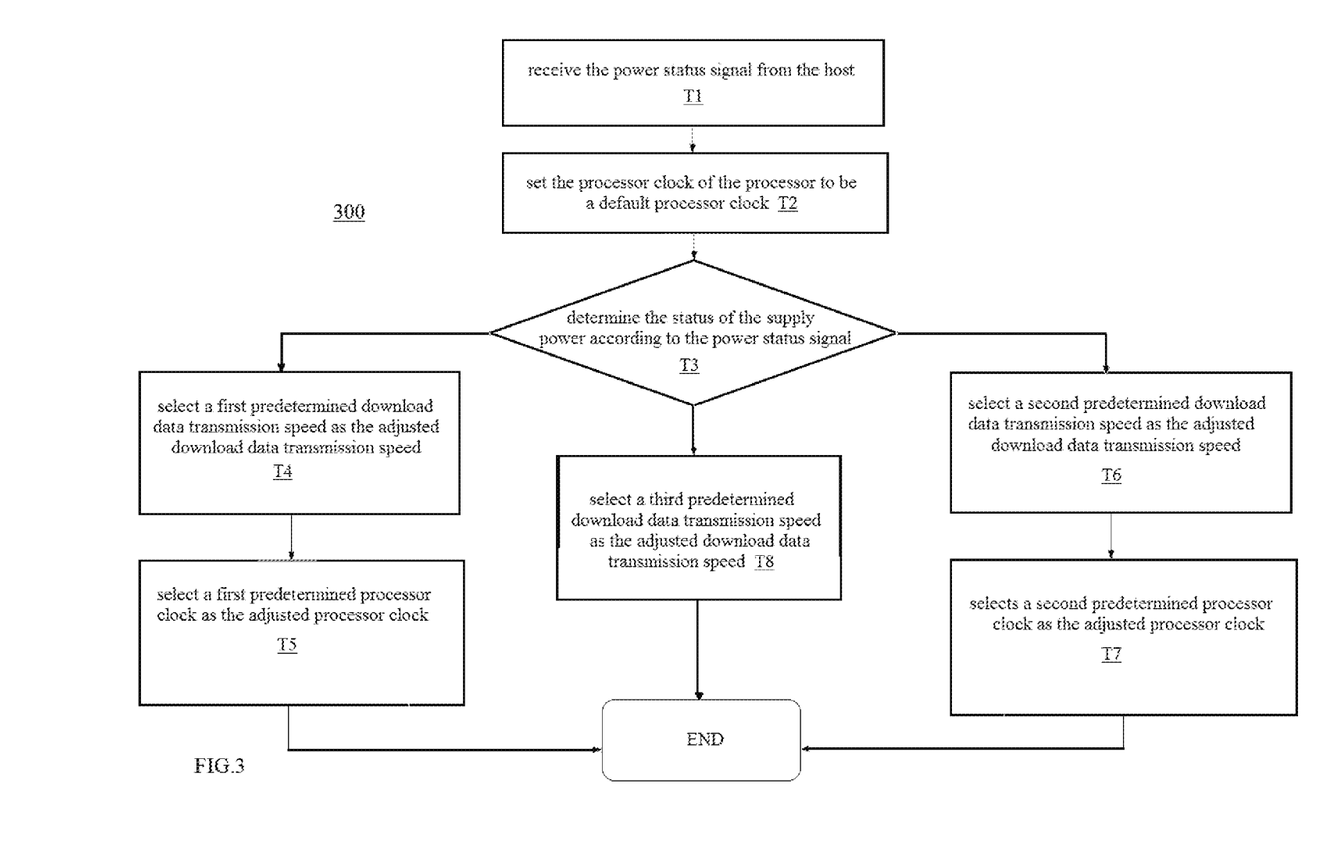
FIG. 3 is a flow chart of an operation method of a bridge module in an embodiment.

FIG. 3 is a flow chart of an operation method 300 of a bridge module in an embodiment. The operation method 300 is applied in a bridge module that is similar to the bridge module shown in FIG. 1. In an embodiment, the operation method 300 is described hereinafter with reference to the data transmission system 10 in FIG. 1.

Unless mentioned otherwise, the sequence of the steps of the operation method can be changed according to requirements. In an embodiment, all/part of the steps are performed simultaneously. In embodiments, some steps can be added, replaced or cancelled according to requirements.

In an embodiment, the operation method 300 includes following steps. In step T1, the processing device 110 receives the power status signal PS from the host 20 via the first transmission unit 120. Details for the step can refer to the step S1, which is not described repeatedly herein.

In step T2, the processor clock of the processor 112 is set to be a default processor clock by the processing device 110. In an embodiment, the processing device 110 selects one of the predetermined processor clocks as the default processor clock. In an embodiment, the processing device 110 selects the lowest one (such as 30 MHz) of the predetermined processor clock as the default processor clock.

In step T3, the processing device 110 determines the status of the supply power SP according to the power status signal PS. The processing device 110 determines whether to adjust the download data transmission speed or the processor clock according to the power status signal PS. The processing device 110 determines the adjusted download data transmission speed and the adjusted processor clock.

In step T4, when the power status signal PS indicates a first status (for example, the voltage of the supply power SP is 5V and the current is 3 A), the processing device 110 selects a first predetermined download data transmission speed (such as 6 GHz) from the predetermined download data transmission speeds as the adjusted download data transmission speed according to the power status signal PS. Details for the selection of the adjusted download data transmission speed can refer to the step S3, which is not described repeatedly herein.

Then, in step T5, the processing device 110 selects a first predetermined processor clock (such as 156.25 MHz) from the predetermined processor clocks as the adjusted processor clock according to the power status signal PS. Details for the determination of the adjusted processor clock can refer to the above paragraphs, which is not described repeatedly herein.

On the other hand, in step T6, when the power status signal PS indicates a second status (for example, the voltage of the supply power SP is 5V and the current is 1.5 A), the processing device 110 selects a second predetermined download data transmission speed (such as 3 GHz) from the predetermined download data transmission speeds as the adjusted download data transmission speed according to the power status signal PS. Details for the selection of the adjusted download data transmission speed can refer to the step S3, which is not described repeatedly herein.

Then, in step T7, the processing device 110 selects a second predetermined processor clock (such as 125 MHz) from the predetermined processor clocks as the adjusted processor clock according to the power status signal PS. Details for the determination of the adjusted processor clock can refer to the above paragraphs, which is not described repeatedly herein.

In step T8, when the power status signal PS indicates a third status (for example, the voltage of the supply power SP is 5V and the current is 0.9 A), the processing device 110 selects a third predetermined download data transmission speed (such as 1.5 GHz) from the predetermined download data transmission speeds as the adjusted download data transmission speed according to the power status signal PS.

In such a way, the total power consumption of the data transceiver device 30 and the bridge module 100 is controlled to be less than the supply power SP. Thus, the unstable operations of the bridge module 100 or the data transceiver device 30 are prevented.

Figure 4:
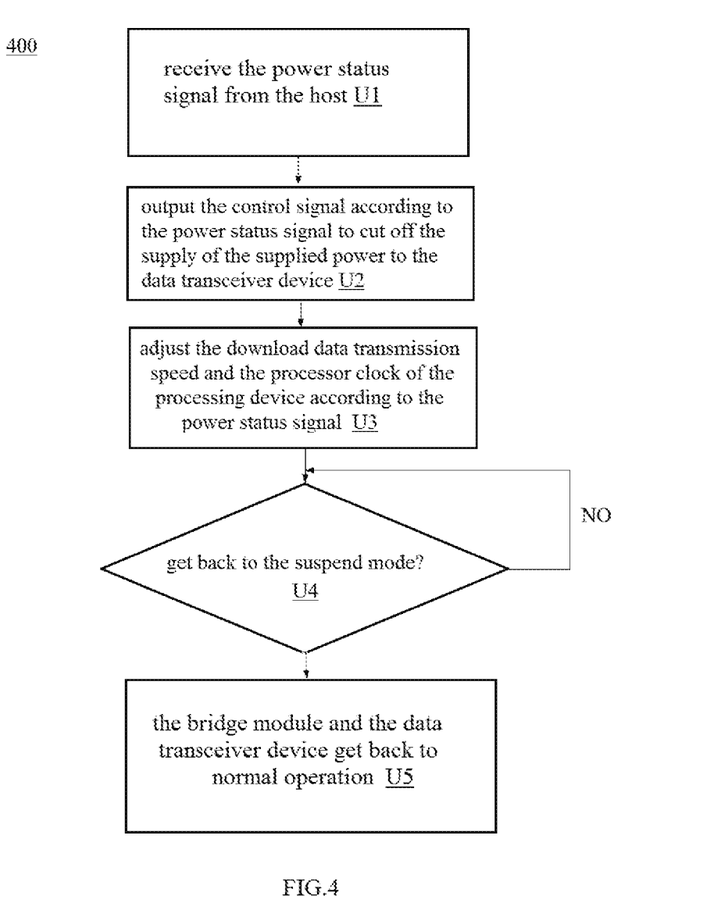
FIG. 4 is a flow chart of an operation method of a bridge module in an embodiment.

FIG. 4 is a flow chart of an operation method 400 of a bridge module in an embodiment. The operation method 400 is applied in a bridge module that is similar to the bridge module shown in FIG. 1. In an embodiment, the operation method 400 is described hereinafter with reference to the data transmission system 10 in FIG. 1.

Unless mentioned otherwise, the sequence of the steps of the operation method can be changed according to requirements. In an embodiment, all/part of the steps are performed simultaneously. In embodiments, some steps can be added, replaced or cancelled according to requirements.

In an embodiment, the operation method 400 includes following steps. In step U1, the processing device 110 receives the power status signal PS from the host 20 via the first transmission unit 120. In an embodiment, the power status signal PS indicates that the lowest supply power SP (such as the voltage of 5V and the current of 0.1 A) is provided to the bridge module 100 and the data transceiver device 30 by the host 20, which means that the host 20 controls the transmission interface between the host 20 and the bridge module 100 (and the data transceiver device 30) to be in the suspend mode. Details for the related contents can refer to the above paragraphs, which is not described repeatedly herein.

In step U2, the processing device 110 outputs the control signal CT to the switch SW to turn off the switch SW according to the power status signal PS, to cut off the supply power SP to the data transceiver device 30. Thus, the data transceiver device 30 is disabled.

In step U3, the processing device 110 adjusts the download data transmission speed and the processor clock according to the power status signal PS. In an embodiment, the processing device 110 adjusts the download data transmission speed to OGHz (that is, the data transmission between the second transmission unit 130 and the data transceiver device 30 is interrupted), and adjusts the processor clock of the processor 112 to 0 MHz.

In step U4, the processing device 110 determines whether the transmission interface between the host 20 and the bridge module 100 and the transmission interface between the bridge module 100 and the data transceiver device 30 change from suspend mode to normal mode according to the power status signal PS. In an embodiment, when the power status signal PS changes to indicate that a normal supply power SP (for example, the voltage is 5V and the current is 3 A, 1.5 A or 0.9 A) is provided by the host 20, that means the transmission interface between the host 20 and the bridge module 100 (and the data transceiver device 30) changes to be in the normal mode. When the power status signal PS remains to indicate that a suspend supply power SP (for example, the voltage is 5V and the current is 0.1 A) is provided by the host 20, that means the transmission interface between the host 20 and the bridge module 100 (and the data transceiver device 30) does not change to be in the normal mode. When the transmission interface changes to be in the normal mode, step U5 is performed. When the transmission interface does not change to be in the normal mode, the step U4 is performed repeatedly.

In step U5, the bridge module 100 and the data transceiver device 30 get back to the normal operation. That is, the processing device 110 adjusts the download data transmission speed and the processor clock to their normal values according to the power status signal PS. Additionally, the processing device 110 outputs the control signal CT to the switch SW to turn on the switch SW according to the power status signal PS to allow the data transceiver device 30 to receive the supply power SP. Thus, the data transceiver device 30 is enabled.

In such a way, the data transceiver device 30 is prevented from being damaged when the supply of the supply power SP is inadequate.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A bridge module comprising:
   a first transmission unit electrically connected to a host, configured to receive a power status signal from the host;
   a second transmission unit electrically connected to a data transceiver device for data transmission with the data transceiver device at a download data transmission speed; and
   a processing device electrically connected to the first transmission unit and the second transmission unit, and configured to use a look-up table to adjust the download data transmission speed of the second transmission unit according to the power status signal;
   wherein the processing device is configured to output a control signal to a control end of a multiplexer electrically connected to the data transceiver device according to the power status signal to cut off a supply power from the host to the data transceiver device;
   wherein the processing device is further configured to select a lowest one of a plurality of predetermined processor clocks as a default processor clock;
   wherein the processing device is further configured to use the look-up table to adjust a processor clock of the processing device according to the power status signal so as to select one of the predetermined processor clocks as the adjusted processor clock.

2. The bridge module according to claim 1,
   wherein the processing device is further configured to select a highest one of a plurality of predetermined download data transmission speeds as a default download data transmission speed;
   wherein the processing device is further configured to use the look-up table to select one of the predetermined download data transmission speeds as the adjusted download data transmission speed according to the power status signal.

3. The bridge module according to claim 1, wherein the power status signal corresponds to the supply power provided by the host to the bridge module and the data transceiver device, and the processing device is configured to adjust the download data transmission speed and the processor clock according to the power status signal, to make a sum of a power consumption of the data transceiver device and a power consumption of the bridge module to be less than the supply power.

4. An operation method comprising:
   receiving a power status signal from a host via a first transmission unit;
   having data transmission with a data transceiver device at a download data transmission speed via a second transmission unit;
   using a look-up table to adjust the download data transmission speed according to the power status signal;
   outputting a control signal to a control end of a multiplexer electrically connected to the data transceiver device according to the power status signal to cut off a supply power to the data transceiver device from the host selecting a lowest one of a plurality of predetermined processor clocks as a default processor clock; and using the look-up table to adjust a processor clock according to the power status signal;

wherein the step of using the look-up table to adjust the processor clock according to the power status signal includes:

using the look-up table to select one of the predetermined processor clocks as the adjusted processor clock according to the power status signal.

5. The operation method according to claim 4, further comprising:

selecting a highest one of a plurality of predetermined download data transmission speeds as a default download data transmission speed;

wherein the step of using the look-up table to adjust the download data transmission speed according to the power status signal includes:

using the look-up table to select one of the predetermined download data transmission speeds as the adjusted download data transmission speed according to the power status signal.

6. The operation method according to claim 4, wherein the power status signal corresponds to the supply power that the host provides to the bridge module and the data transceiver device, and the step of using the look-up table to adjust the download data transmission speed and the processor clock according to the power status signal includes:

using the look-up table to adjust the download data transmission speed and the processor clock according to the power status signal to make a sum of a power consumption of the data transceiver device and a power consumption of the bridge module to be less than the supply power.

* * * * *